May 8, 1962 E. A. WAGNER 3,033,100
EXPANSIBLE BROILING RACK
Filed Dec. 21, 1959
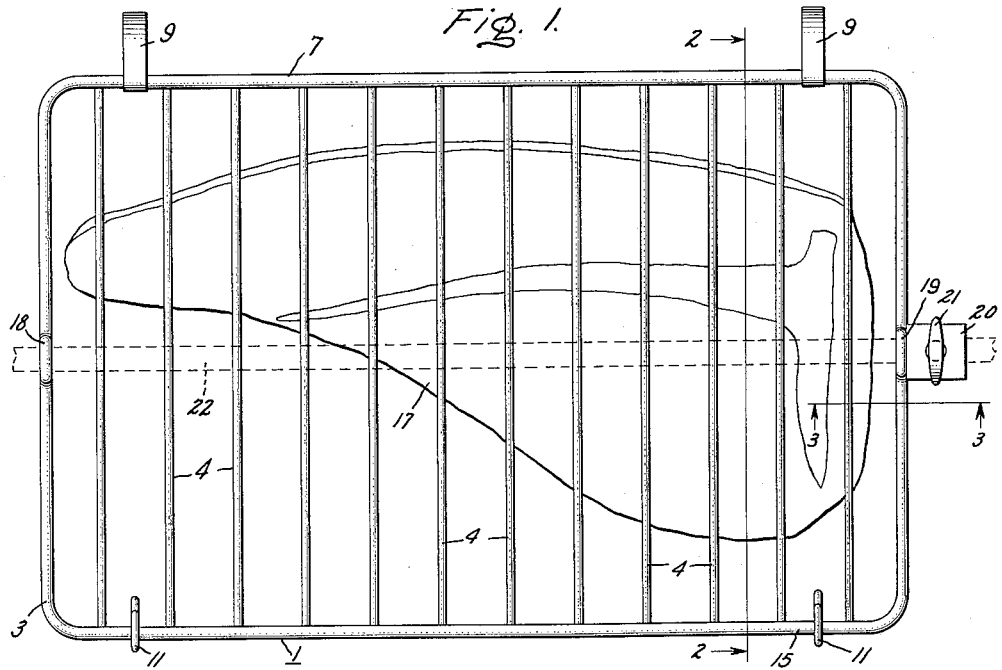
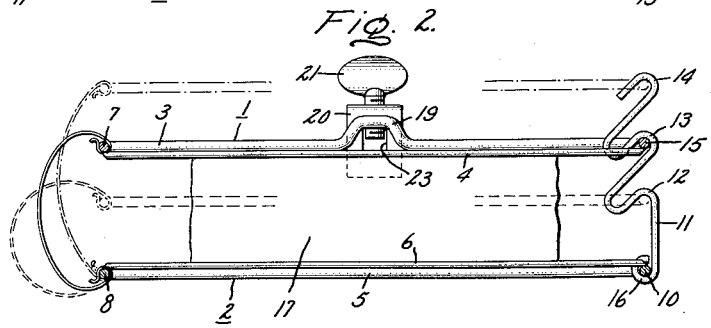
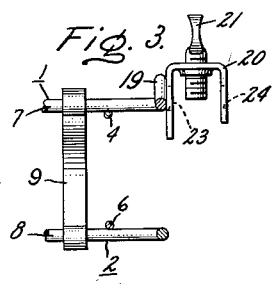
Inventor:
Ernest A. Wagner,
by T G Dupont
His Attorney.

з,033,100
Patented May 8, 1962

3,033,100
EXPANSIBLE BROILING RACK
Ernest A. Wagner, Allentown, Pa., assignor to General Electric Company, a corporation of New York
Filed Dec. 21, 1959, Ser. No. 861,041
3 Claims. (Cl. 99—402)

This invention relates to broiling racks, and has as its principal object the provision of an improved expansible dual grid rack so arranged that foods of various thicknesses may be securely clamped between the grids.

A further object of my invention is to provide an expansible broiling rack which functions to hold food in a securely clamped position regardless of any change in thickness which may occur during cooking operations.

Further objects and advantages of this invention will become apparent as the following description proceeds, and the features of novelty which characterize the invention will be pointed out with particularity in the claims appended to and forming a part of this specification.

Briefly stated, in accordance with one aspect of my invention I provide a broiling rack comprising a pair of rectangular grid members disposed in face-to-face generally parallel relation, expansible spring members pivotally secured at their ends to adjacent edge portions of the grids, and latch members having a plurality of spaced catch portions pivotally mounted on the edge of one of the grids opposite the spring members so as to be engageable with the adjacent edge of the opposing grid, whereby foods of various thicknesses may be securely clamped between the grids.

For a better understanding of the invention, reference may be made to the following description and the accompanying drawing in which:

FIG. 1 is a top plan view of a rack embodying my invention;

FIG. 2 is a cross-sectional view taken along the line 2—2 in FIG. 1, and

FIG. 3 is a cross-sectional view taken along the line 3—3 in FIG. 1.

Referring to the drawing, the numerals 1 and 2 generally designate a pair of rectangular grid members arranged in face-to-face parallel relationship. Grid 1 includes a wire frame 3 which is rectangular in form and a plurality of spaced parallel wires 4 welded or otherwise secured to frame 3. Similarly, grid 2 comprises a rectangular wire frame 5 and a plurality of spaced parallel wires 6 secured at their ends to opposite portions of frame 5.

Edge portion 7 of grid 1 is mounted in hinged relation to edge portion 8 of grid 2 by spring members 9 which are preferably C-shaped leaf springs, the ends of the springs being bent over edges 7 and 8 so as to provide pivotal connections. Both the unstressed and the fully extended positions of spring 9 are shown in broken lines in FIG. 2, and its partially extended position is shown in full lines. Thus edge portions 7 and 8 of grids 1 and 2 are free to move relative to each other through a range of movement determined by the size of springs 9 and also grids 1 and 2 are free to pivot about these edge portions.

Mounted on the edge portion 10 opposite edge portion 8 of grid 5 are a pair of latch members 11 provided with spaced catch portions 12, 13 and 14 each adapted selectively to engage adjacent edge portion 15 of grid 1. Latch member 11 includes a hook portion 16 pivotally secured to edge portion 10 of grid 5 and is made of wire bent in serpentine form, the return bend portions thereof forming catch portions 12, 13 and 14. Thus it will be seen that edge portion 15 of grid 1 may be secured to edge portion 10 of grid 2 in any one of three different spaced relationships so that foods of various thicknesses may be clamped between the grids. At the same time, edge portions 7 and 8 of the grids are free to move through a corresponding range of positions by virtue of the spring action of spring hinges 9, and when foods having generally parallel surfaces (such as the steak 17 shown in the drawing) are placed in the rack grids 1 and 2 are maintained in generally parallel relationship. This is true, it will be noted, regardless of the thickness of the food within the limit of the expandability of springs 9.

On the other hand, the expandability of springs 9 assures that foods of uneven surface configuration, such as chicken parts, are held securely between the grids since the flexibility of the spring permits the rack to conform in some degree to the irregular shape of the food. Further, the spring action of the hinges urges the grids together and assures that the food is securely clamped in spite of shrinkage which may occur as the cooking operation proceeds.

The rack shown in FIG. 1 is particularly useful in rotisseries in which the food is rotated on a spit as the cooking operation proceeds. Thus grid 1 includes a pair of aligned U-shaped spit mounting portions 18 and 19 formed in opposite edge portions of frame 3 and also a U-shaped clamping bracket 20 rigidly secured to frame 3. Bracket 20 is provided with a clamping screw 21 arranged to engage a spit 22. Aligned apertures 23 and 24 in leg portions of bracket 20 are provided to receive the spit, and screw 21 is threaded in the bight portion of the bracket so that when tightened it engages the spit. Thus spit 22 may be inserted through apertures 23 and 24 in bracket 20 and also through U-shaped portions 18 and 19 of frame 3, and then clamped in place by means of thumb screw 21.

While I have shown and described a particular embodiment of my invention, I do not desire the invention to be limited to the particular construction disclosed, and I intend by the appended claims to cover all modifications within the true spirit and scope of my invention.

What I claim is:

1. A broiling rack comprising a pair of rectangular grids each including a wire frame of rectangular configuration, each of said frames having first and second parallel edge portions, one of said frames having a pair of U-shaped spit supporting portions formed in the side portions thereof intermediate the first and second edge portions and a plurality of spaced parallel wires secured at their ends to said first and second edge portions, a clamping bracket secured to one of said spit supporting portions, a thumb screw threaded in said bracket for movement along an axis perpendicular to the plane of said one of said frames, a pair of spaced apart expansible C-shaped leaf spring members each pivotally secured at one end to the first edge portion of one of said frames and at its other end to the first edge portion of the other of said frames, and a pair of spaced apart latch members made of wire bent in serpentine form pivotally secured to the second edge portion of one of said frames, said latch member having a plurality of spaced catch portions each adapted selectively to engage the second edge portion of the other of said frames, each of said spring members being formed so that in its unstressed position its ends are spaced apart a distance substantially equal to the shortest distance from the second edge portion of said one of said frames to the closest catch portion of one of said latch members and in its fully extended position its ends are spaced apart a distance substantially equal to the shortest distance from the second edge portion of said one of said frames to the most distant catch portion of one of said latch members, whereby foods of various thicknesses may be clamped between said grids.

2. A broiling rack comprising a pair of rectangular grids each having first and second parallel edge portions, said grids being disposed in face-to-face generally parallel relation, a pair of spaced apart expansible spring members each pivotally secured at one end to the first edge portion of one of said grids and at its other end to the first edge portion of the other of said grids, and a pair of spaced apart latch members made of wire bent in serpentine form pivotally secured to the second edge portion of said one of said grids, said latch member having a plurality of spaced catch portions each adapted selectively to engage the second edge portion of said other of said grids, each of said spring members being formed so that in its unstressed position its ends are spaced apart a distance substantially equal to the shortest distance from the second edge portion of said one of said frames to the closest catch portion of one of said latch members and in its fully extended position its ends are spaced apart a distance substantially equal to the shortest distance from the second edge portion of said one of said frames to the most distant catch portion of one of said latch members, whereby foods of various thicknesses may be clamped between said grid members.

3. A broiling rack as defined in claim 2 in which said spring members are C-shaped leaf springs.

References Cited in the file of this patent

UNITED STATES PATENTS

| | | |
|---|---|---|
| 547,593 | Wagoner | Oct. 8, 1895 |
| 1,155,838 | Rose | Oct. 5, 1915 |
| 1,794,870 | Serrell | Mar. 3, 1931 |
| 2,058,172 | Myers | Oct. 20, 1936 |
| 2,280,131 | Rossini | Apr. 21, 1942 |
| 2,607,286 | Krissel | Aug. 19, 1952 |
| 2,895,408 | Glenny | July 21, 1959 |

FOREIGN PATENTS

| | | |
|---|---|---|
| 770,794 | France | July 9, 1934 |

OTHER REFERENCES

Publication furnished with "Roto Broiler," mfd. by Roto-Broil Corp. of America, 33—00 Northern Blvd., Long Island City, New York, identified as Form No. 346. Publicly available Oct. 1, 1956.